United States Patent [19]

Watanabe et al.

[11] Patent Number: 5,033,287
[45] Date of Patent: Jul. 23, 1991

[54] METHOD FOR INSPECTING A SEALING PROPERTY OF A PLASTIC CONTAINER

[75] Inventors: Toshiaki Watanabe; Mitsuru Ohba, both of Kawasaki, Japan

[73] Assignee: Ajinomoto Co., Inc., Tokyo, Japan

[21] Appl. No.: 587,514

[22] Filed: Sep. 25, 1990

Related U.S. Application Data

[63] Continuation of Ser. No. 322,973, Mar. 14, 1989, abandoned.

[30] Foreign Application Priority Data

Mar. 14, 1988 [JP] Japan ................................ 63-60092
Feb. 27, 1989 [JP] Japan ................................ 1-46164

[51] Int. Cl.⁵ .............................................. G01M 3/36
[52] U.S. Cl. ............................................ 73/52; 73/49.2; 73/49.3
[58] Field of Search ..................... 73/52, 49.2, 49.3; 53/425

[56] References Cited

U.S. PATENT DOCUMENTS

| | | | |
|---|---|---|---|
| 2,040,726 | 5/1936 | Ball | 428/511 |
| 3,295,676 | 12/1966 | Ochs | 209/529 |
| 3,371,781 | 3/1968 | Armbruster et al. | 73/52 |
| 3,985,018 | 10/1976 | Fox | 73/52 |
| 4,522,015 | 6/1985 | Hildebolt | 53/425 |
| 4,735,508 | 4/1988 | Bellio | 73/52 |
| 4,880,129 | 11/1989 | McHenry et al. | 53/425 |
| 4,955,226 | 9/1990 | Beaty et al. | 73/52 |

FOREIGN PATENT DOCUMENTS

| | | | |
|---|---|---|---|
| 255596 | 3/1964 | Australia | 73/52 |
| 47811 | 11/1978 | Japan | 73/52 |
| 91232 | 5/1985 | Japan | 73/49.3 |

*Primary Examiner*—Hezron E. Williams
*Assistant Examiner*—Craig Miller
*Attorney, Agent, or Firm*—Oblon, Spivak, McClelland, Maier & Neustadt

[57] ABSTRACT

A method for inspecting a sealing property of a plastic container having contents. The container has a lid which is deflectable under a negative pressure developed in the container. The contents are charged in to the container so that a negative pressure is developed under a normal temperature or room temperature. The deflection of the lid is measured so as to detect the sealing property of the container.

4 Claims, 4 Drawing Sheets

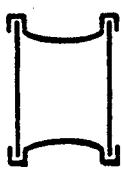 
FIG.6a   FIG.6b
FIG.7
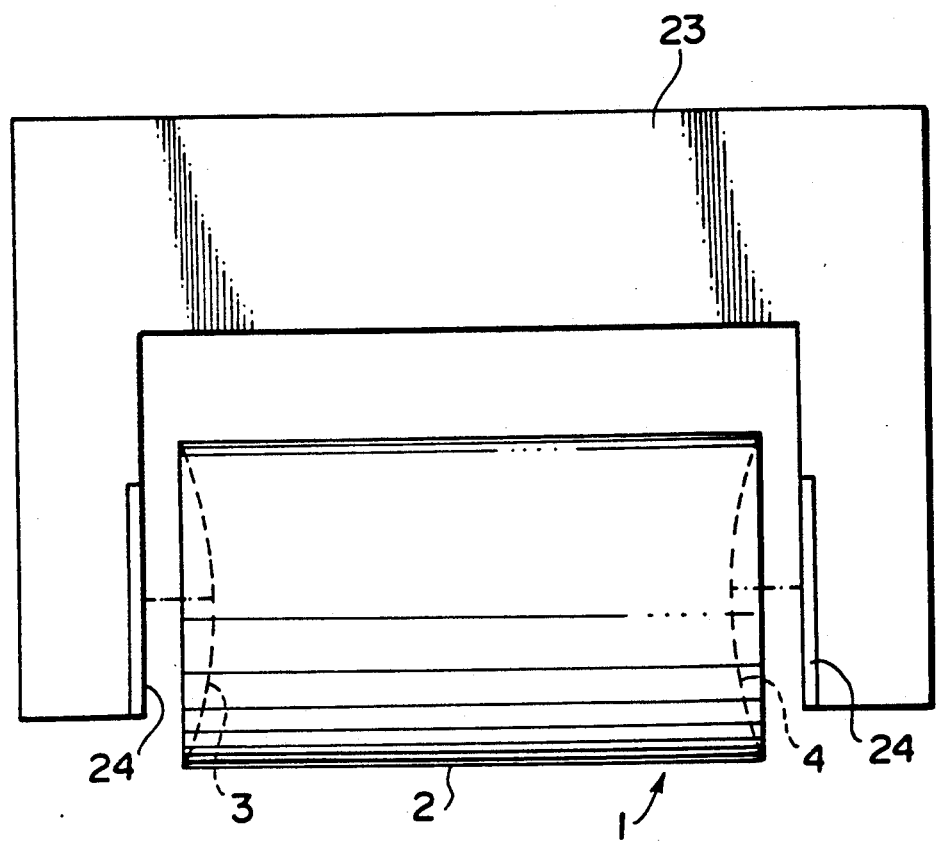

METHOD FOR INSPECTING A SEALING PROPERTY OF A PLASTIC CONTAINER

This application is a continuation of application Ser. No. 07/322,973, filed on Mar. 14, 1989, now abandoned.

BACKGROUND OF THE INVENTION

1. Field of the Invention

The present invention relates to a plastic container for contents such as foodstuff and medicines. More particularly, the present invention pertains to a method for inspecting the sealing property of a plastic container and a plastic container inspected by the method.

2. Discussion of the Prior Art

As a container for charging foodstuff or medicines, a metal container such as a metal can, a glass bottle and a plastic container are generally used. These containers are also subjected to a retort sterilization process after the contents are charged into the container. Developments have been made to provide a method for inspecting the sealing property of the container which is charged with the contents, the method being appropriate for the property of the container. For example, the plastic container suitable for the retort sterilization includes a retort pouch and in this type of container a visual inspection is carried out by depressing the pouch and detecting leakage. As an alternative method, a proposal is made to put the container in a chamber of a reduced pressure and detect a pressure change in the chamber which may be produced due to a leakage. It should however be noted that the aforementioned methods which have hithertofore been developed for the inspection of the sealing property of a plastic container are low in detecting precision so that they are not widely used in actual practice. Further, no practical method has as yet been developed for the inspection of the sealing property of a plastic container of a bottle configuration, cup configuration or a tray configuration.

SUMMARY OF THE INVENTION

Thus, an object of the present invention, in view of the aforementioned circumstance, is to solve the problem that no satisfactory method exists for inspecting the sealing property of a plastic container. More specifically, the present invention has the object of providing a simple and reliable method for inspecting the sealing property of a plastic container.

Another object of the present invention is to provide a method for inspecting the sealing property of a plastic container having contents which have been subjected to a retort sterilization process.

It is a further object of the present invention to provide a plastic container which is inspected by such inspection method.

According to the present invention, the above and other objects are accomplished by providing a three-dimensional plastic container having at least a portion which is deflectable under a negative pressure in the container, charging the container with contents in such a manner that a negative pressure will be produced in the container under a room temperature, sealing the container and then measuring the deflection at said portion which is deflectable under a negative pressure in the container to determine the acceptability of the sealing property of the container from the negative pressure in the container. Where the content is subjected to a retort sterilization, it is preferable that the pressure in the retort oven is regulated so that a positive pressure is produced in the container, or in other words, that the pressure in the container is higher than that in the retort oven during the cooling process to thereby reform the container. When the container is cooled down to room temperature, measurement is made as to the deflection of the container under the negative pressure to determine the sealing properly.

Described more specifically, the present invention provides a method for inspecting the sealing property of a plastic container comprising the steps of providing a three-dimensional plastic container having at least a portion which is deflectable under a negative pressure in the container, charging the container with contents in such a manner that a negative pressure will be produced in the container under room temperature, sealing the container, and then measuring a deflection at said deflectable portion after the content in the container is cooled down to the room temperature to determine acceptability of the sealing property of the container from the negative pressure in said container. In one aspect of the present invention, the container is subjected to sterilization under a predetermined temperature for a predetermined time in a retort oven and in the cooling process the pressure in the retort oven is regulated so that a positive pressure is produced in the container to make the container reform while it is being cooled. The deflection of the container is then measured in a similar manner.

According to the present invention, the negative pressure in the container under the room temperature may alternatively be produced by charging the contents under a high temperature, sealing the container under an atmosphere of a reduced pressure after the content is charged, or sealing the container while steam is being injected, a combination of two or more of these methods. Further, according to the present invention, there is provided a plastic container having contents which are subjected to a retort sterilization and inspected by the aforementioned method.

According to the present invention, the plastic container having at least a portion which is deflectable under a negative pressure in the container is charged with contents in a manner that a negative pressure will be produced under room temperature and then sealed. Therefore, as long as the sealing property is satisfactory, the deflectable portion of the container is deflected inwardly under the negative pressure. It is therefore possible to determine the acceptability of the sealing property through a measurement of the deflection. In the case where retort sterilization is to be carried out, the pressure in the retort oven is regulated following the heating process for the retort sterilization in a manner that a positive pressure is produced in the container with respect to the pressure in the retort oven. It will therefore be noted that in this process the deflectable portion of the container is reformed by being slightly bulged outwardly or to the shape which the container had when the contents was charged. When the content are cooled down to the room temperature, a negative pressure is produced in the container so that the deflectable portion is deflected inwardly. If the sealing property of the container is not satisfactory, however, negative pressure will not be produced in the container so that no deflection will be produced or the deflection will be small. It is therefore possible to inspect the sealing property of the container through measurement of the deflection.

The above and other objects and features of the present invention will become apparent from the following descriptions of preferred embodiments taking reference to the accompanying drawings.

BRIEF DESCRIPTION OF THE DRAWINGS

FIGS. 6 (a) and (b) are diagrammatical sectional views of the container showing the configurations during the retort sterilization process;

FIG. 7 shows one example of the sealing property inspection;

DESCRIPTION OF THE PREFERRED EMBODIMENTS

Figure 1:
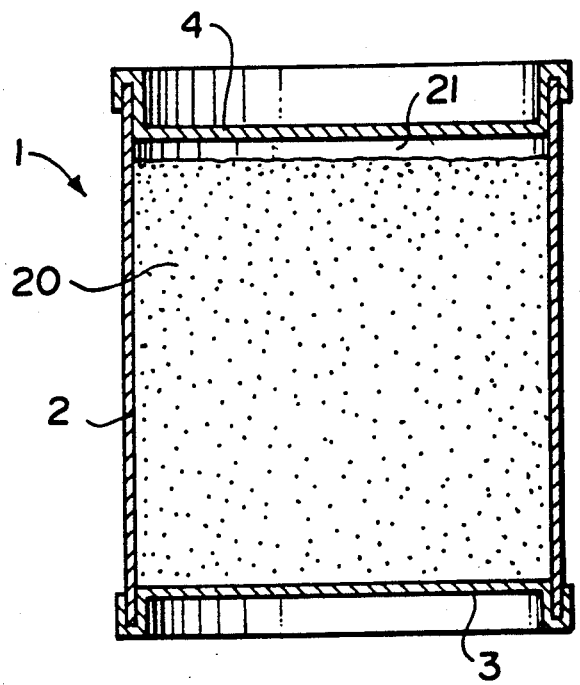
FIG. 1 is a sectional view showing one example of the container which can be inspected in accordance with the present invention.
Figure 2:
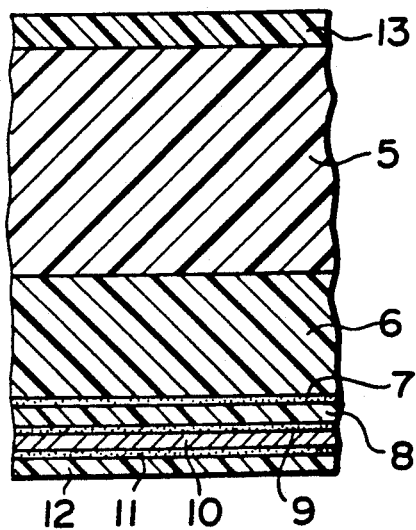
FIG. 2 is an enlarged sectional view of the container body.

Referring first to FIG. 1, there is shown a container 1 to which the present invention can be applied and which includes a container body 2, a bottom 3 and a lid 4. As shown in FIG. 2, the container body 2 includes a plastic layer 5 and a sheet 6 of a non-stretched polypropylene is attached to the inner surface of the plastic layer 5. A layer 8 of a non-stretched polypropylene is attached to the sheet 6 through an adhesive layer 7. An aluminum foil layer 10 is attached to the inner surface of the polypropylene layer 8 through an adhesive layer 9. The aluminum foil 10 has an inner surface to which a layer 12 of a non-stretched polypropylene is attached through an adhesive layer 11. The plastic layer 5 has an outer surface which is covered by a coating layer 13 of polypropyleneblockcopolymer.

Figure 3:
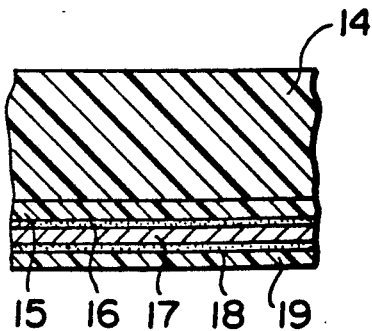
FIG. 3 is an enlarged sectional view of the bottom and the lid.

As shown in FIG. 3, the bottom 3 and the lid 4 include a polypropylene layer 14, a layer 15 of non-stretched polypropylene provided at the inner surface of the polypropylene layer 14 and an aluminum foil 17 attached to the inner surface of the layer 15 through an adhesive layer 16. The aluminum foil 17 has an inner surface to which a layer 19 of non-stretched polypropylene is attached through an adhesive layer 18. The bottom 3 having the structure described above is attached by welding to the bottom end of the container body 2. With this state, a content 20 which may be foodstuff or medicine is charged from the top end of the container body 2 to a predetermined level and the lid 4 is attached to the top end of the container body 2 by means of welding. At this time, there is unavoidably produced a space 21 between the charged contents 20 and the lid 4.

In charging the contents 20, a high temperature may be maintained so that a negative pressure or a pressure lower than an environmental pressure will be developed in the container when the content 20 is cooled down to the room temperature. The negative pressure can also be produced by sealing the container, after the content is charged, under a reduced pressure or by injecting steam prior to attaching the lid 4. In the case of a container having a configuration as shown in FIG. 1, the bottom 3 and the lid 4 are inwardly deflected when the negative pressure is developed in the container. The bottom 3 and the lid 4 may be referred to as portions which are deflectable under a negative pressure.

Figure 4:
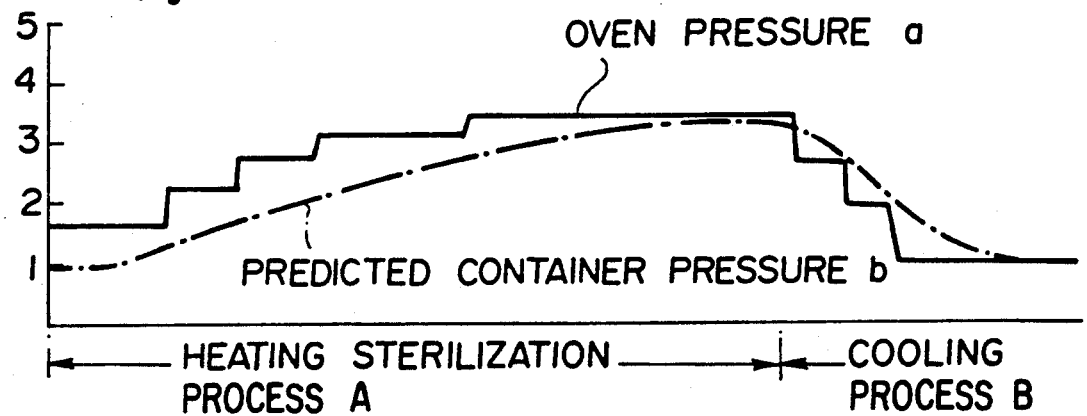
FIGS. 4 and 5 are diagrams showing the retort sterilization process.
Figure 5:
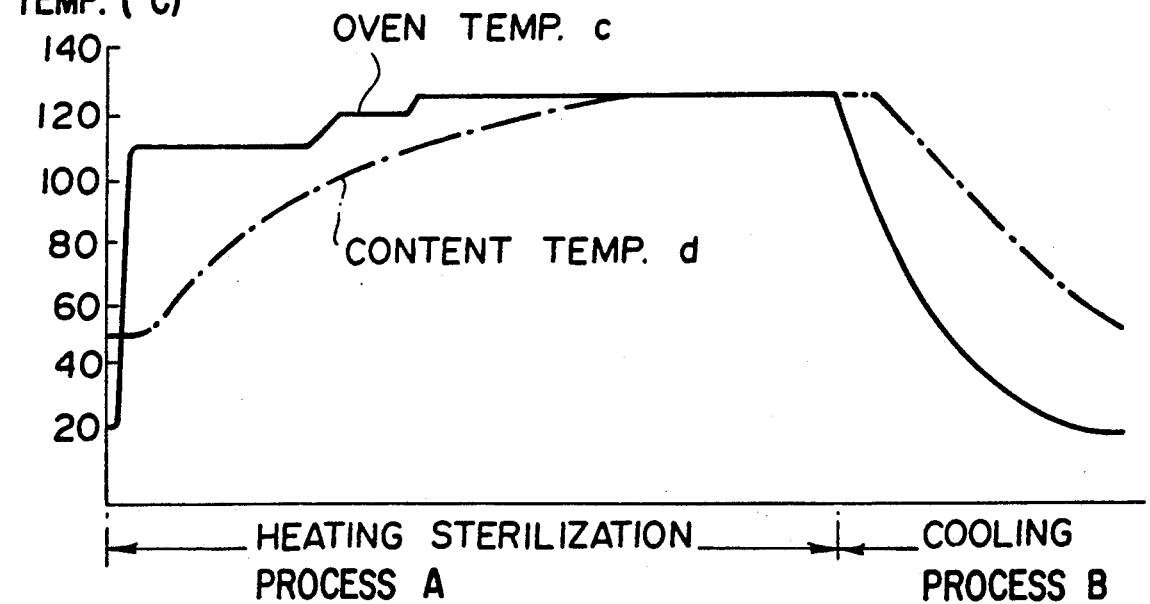

In the container 1 which is thus charged with the contents 20, it is possible to determine acceptability of the sealing property by measuring the deflection of one or both of the bottom 3 and the lid 4. When the content is to be subjected to a retort sterilization, the container 1 having the contents 20 charged therein is introduced into a retort oven (not shown). FIGS. 4 and 5 show the retort sterilizing process. In FIG. 4, line a shows the pressure in the retort oven and the line b shows a predicted pressure in the container 1. In FIG. 5, line c shows the temperature in the retort oven and line d shows the content temperature, that is, the temperature of the contents 20 charged in the container 1. The pressure in the container is affected by the content charging temperature, the volume of the space 21 in the container 1, the expansion and shrinking property of the content and the deformation of the container 1 in response to a temperature change. Therefore, the predicted pressure in the container 1 can be obtained taking these factors into account.

As shown in FIG. 4, in the heating and sterilizing process A control is provided so that the predicted container pressure b is slightly lower than the oven pressure a. The pressure difference may be determined to be a value under which the components of the container 1, namely, the container body 2, the bottom 3 and the lid 4 are not broken under the pressure difference. In the heating and sterilizing process, the oven temperature c is increased as shown in FIG. 5 and the content temperature d is increased with a certain delay with respect to the increase in the oven temperature c. In this stage, the container 1 assumes the configuration shown in FIG. 6 (a) and the bottom 3 and the lid 4 are deflected to produce an inwardly concave shape.

As soon as the sterilizing process is finished, the cooling process B is started. In the cooling process B, the content temperature d is decreased as shown in FIG. 5 with a certain delay with respect to the oven temperature c. It should further be noted that as shown in FIG. 4 the pressure a in the oven is regulated so that it is lower than the predicted pressure b in the container 1 to a certain extent. Therefore, the container 1 is deformed as shown in FIG. 6 (b) by having the bottom 3 and the lid 4 bulged outwardly. It is possible that the plastic material constituting the body 2, the bottom 3 and the lid 4 of the container 1 are softened to a certain extent under the sterilization temperature so that there are produced permanent deformations particularly in the bottom 3 and the lid 4. However, since the oven pressure a is maintained to a certain extent higher than the predicted pressure b in the container 1, it is possible to reform the bottom 3 and the lid 4 to the configuration which the container had at time of charging the content. The control of the oven pressure a in the cooling process is aimed at reforming the container 1 so that it is required that the control is relatively strict.

Figure 8A:
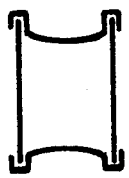
FIGS. 8 (a) and (b) show the container configurations having an acceptable and unacceptable sealing properties, respectively; and, FIG. 9 shows another example of the container to which the inspection of the present invention can be applied.
Figure 8B:
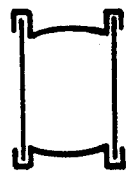

The retort sterilizing process comes to an end when the content temperature is lowered to 50° C. and the container 1 is taken out of the oven. Thereafter, a negative pressure is developed in the container 1 as the content 20 is cooled down to the room temperature producing deflections in the bottom 3 and the lid 4. By measuring the deflections, the sealing property of the container can be inspected. FIG. 7 shows an example of the measuring method. In this example, a high frequency detector 23 is used. The high frequency detector 23 is provided with a pair of detecting heads 24 which are located at predetermined positions for measuring the distances between the detector heads and the bottom 3 and the lid 4, respectively. In the case where the container has a satisfactory sealing property, it has a configuration as shown in FIG. 8 (a), however, if the sealing is insufficient, the configuration will be as shown in FIG. 8 (b). It will therefore be understood that the quality of the sealing of the container 1 can be determined through the measurement of the distances between the detecting heads 24 and the bottom 3 and the lid 4, respectively. The measurement may be made with respect to only one of the bottom 3 and the lid 4.

Figure 9:
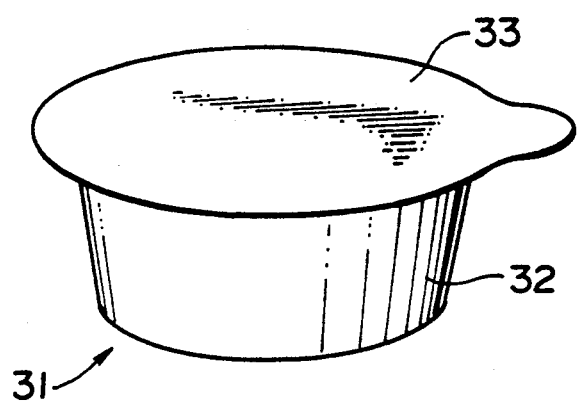

FIG. 9 shows another example of the container to which the present invention can be applied. In this example, the container 31 include an open-top, cup-shaped container body 32 and a lid 33 welded to the upper portion of the body 32. The lid 33 provide the portion which is deflected under the negative pressure in the container. The container body 32 and the lid 33 may be of a laminated structure as in the previous example or any other known plastic container material.

The invention has thus been shown and described with reference to specific embodiments, however, it should be noted the invention is in no way limited to the details of the illustrated arrangements or the described processes but changes and modifications may be made without departing from the scope of the appended claims.

We claim:

1. A method for inspecting a sealing property of a plastic container containing contents which are subjected to retort sterilization, which comprises the steps of:
   providing a three-dimensional plastic container having at least a portion which is deflectable under a negative pressure in the container,
   charging the container with contents in a manner so that a negative pressure will be produced in the container at room temperature,
   sealing the container,
   subjecting the container to sterilization in a retort oven at a predetermined temperature for a predetermined time;
   regulating the pressure in the retort oven while coating the container so that a positive pressure is developed in the container so as to reform the container, and
   measuring deflection at said deflectable portion after the contents in the container are cooled down to the room temperature to determine acceptability of the sealing property of the container from the negative pressure in said container.

2. A method in accordance with claim 1 which comprises producing the negative pressure in the container under room temperature by:
   charging the contents while the contents are maintained at a high temperature.

3. A method in accordance with claim 1 which comprises producing the negative pressure in the container under room temperature by sealing the container in an environment of a reduced pressure after it is charged with the content.

4. A method in accordance with claim 1 which comprises producing the negative pressure in the container under room temperature by injecting steam while the container is being sealed.

* * * * *